UNITED STATES PATENT OFFICE.

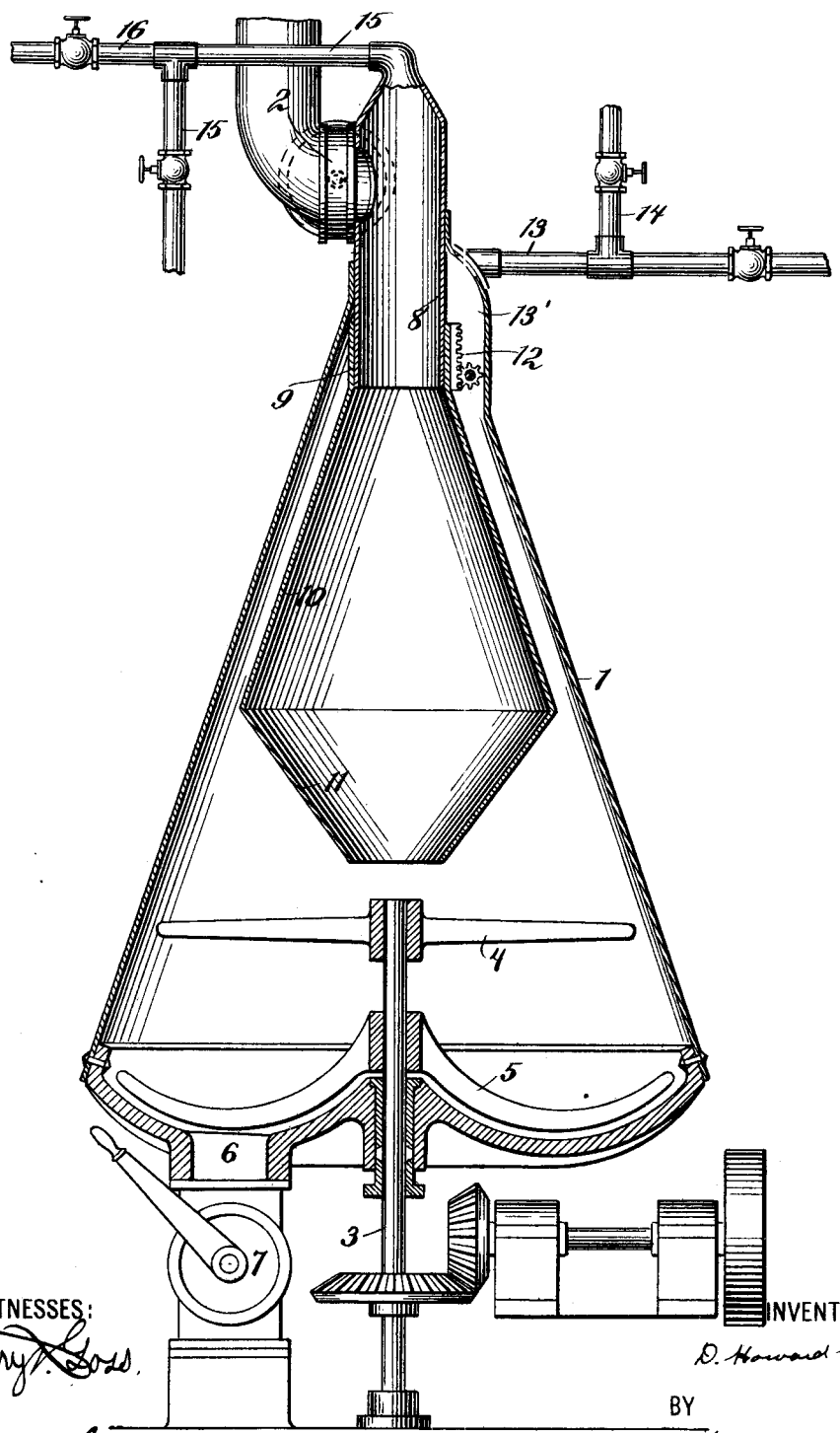

DANIEL HOWARD HAYWOOD, OF NEW YORK, N. Y., ASSIGNOR TO NATHANIEL B. POWTER, OF BROOKLYN, NEW YORK.

APPARATUS FOR SEPARATING FLUIDS OF DIFFERENT DENSITIES.

SPECIFICATION forming part of Letters Patent No. 675,891, dated June 11, 1901.

Application filed October 25, 1900. Serial No. 34,246. (No model.)

*To all whom it may concern:*

Be it known that I, DANIEL HOWARD HAYWOOD, a citizen of the United States, residing at New York, in the county of New York and State of New York, have invented certain new and useful Improvements in Apparatus for Separating Fluids of Different Densities; and I do hereby declare the following to be a full, clear, and exact description of the invention, such as will enable others skilled in the art to which it appertains to make and use the same.

My invention relates to improvements in apparatus for extracting oil and grease from grease-bearing material, and more particularly to improvements in apparatus for separating oil and grease from water and solids.

My invention consists in employing for the purpose a vessel the sides of which preferably taper toward the top and within which is a tube or chamber, which may be termed a "bell chamber," open at the bottom and provided with means for introducing into it air or other gas under pressure for the purpose of forcing liquid within it out through its bottom opening, and thereby forcing out through a suitable discharge-orifice of the outer vessel a portion of the liquid contained therein.

My invention consists, further, in providing the said bell chamber with a suitable discharge-orifice and in providing the outer vessel with means for introducing air or other gas under pressure into it for the purpose of forcing out of said bell chamber and through the said discharge-orifice the fluid within it.

My invention consists, further, in the novel details of construction and arrangement of the apparatus.

The objects of my invention are to avoid the use of an excess of water or similar fluid for floating off the oil contained in the digesters or separating vessels employed in the extraction of oil and grease and the consequent evaporation of such water in order to dry the solid residue and to make the apparatus employed as simple, inexpensive, and reliable as possible. These objects are attained in the invention herein described, and illustrated in the drawing which accompanies and forms a part of this specification, and which shows a central vertical section of the apparatus.

In the extraction of oil and grease from waste animal matter—such as fish, slaughter-house refuse, garbage, and the like—it is customary to treat such material in a digester with heat and moisture, so as to liberate the oil and grease, and then to separate the oil and grease from the water and the solid material by admitting a large quantity of water, and so floating the oil and grease upward and out through a suitable outlet. Such separation may be conducted either in the digester itself or in a separate vessel. This method is objectionable in that it adds to the contents of the digester or other vessel a large quantity of water, all of which must be evaporated subsequently in order to dry the solid material remaining after the oil is removed. The evaporation of this water increases materially the cost of the treatment. In the apparatus herein described the floating off of the grease by the addition of an excess of water is avoided, and thereby the cost of drying the solid residue is very greatly decreased.

Referring to the drawing, 1 designates a vessel adapted to be used for the separation of oil and grease from water and solid material. It may be the digester in which the treatment for the liberation of the oil and grease is conducted or it may be a separate vessel into which the contents of such digester may be passed. Its charge may be introduced through a valve 2 at the top. The said vessel is provided with a stirrer-shaft 3, having stirring-arms 4 and scrapers 5, and is likewise provided with an outlet 6, through which the material remaining in the digester after the oil and grease have been removed may be withdrawn. Such discharge-outlet is normally closed by a valve 7.

A pipe 8 projects downward from the top of the vessel 1 and forms a continuation of the supply-pipe 2. Upon it is mounted the tubular stem 9 of a chamber 10 of peculiar form, which chamber is open at the bottom and forms a continuation of the pipe 8. The main portion of the chamber 10 corresponds substantially to the form of the portion of the vessel 1 in which said chamber is located, there being sufficient space between the chamber 10 and the sides of vessel 1, however, to permit the passage of liquid upward on the outside of said chamber; but near the bottom the chamber 10 is provided with a reversely-tapering portion 11. The chamber 10 has, therefore, the form of two cones, with their bases toward each other. The chamber 10 is vertically adjustable upon the tube 8, a rack-and-pinion elevating mechanism 12 being provided for adjusting it.

The vessel 1 is provided on one side of its neck with an enlargement 13', with which an oil-discharge pipe 13 communicates. Another pipe 14 for supplying air, steam, or other gas under pressure is also provided, and both pipes 13 and 14 have suitable valves. The chamber 10 likewise has an oil-discharge pipe 15 and a compressed-air pipe 16, both provided with suitable valves.

The particular vessel shown in the drawing is designed to be used for the separation of oil and grease from material which has previously been treated in a suitable digester for the purpose of liberating the oil and grease therein. The charge of such material admitted through the pipe 2 passes downward through the tube 8 and chamber 10 and through the open mouth of said chamber into the lower portion of the vessel 1. The liquid accompanying such charge will ordinarily rise well up within the chamber 10 and well above the downwardly-tapering lower portion 11 thereof, the liquid on the outside of the chamber 10 rising to a corresponding level, since the valve in pipe 13 should be open while the vessel is being filled to permit the escape of air. The charge having been introduced in this manner, the stirrer-shaft 3 is rotated for the purpose of thoroughly agitating the material within the vessel, thereby facilitating the rising of the oil and grease to the top and at the same time producing a centrifugal motion, which in itself tends to throw the heavier liquid, such as water, to the outside and to bring the oil and grease to the center, where they may enter the chamber 10 during the rotation of the stirrer-shaft or afterward when the rotation of such shaft has been stopped. The centrifugal motion also throws solid matter which may be near the top against the inclined sides of the vessel 1 and tends to crowd such solid matter downward along such inclined sides. During the rotation of the stirrer-shaft the valves in pipes 13 and 15 may be open in order to permit free rise of the lighter liquid in and around the chamber 10. The contents of the vessel 1 having been sufficiently agitated, the rotation of the stirrer-shaft may be stopped, and air, steam, or other gas under pressure may be admitted through pipe 16 to the interior of chamber 10, (the valve in pipe 15 being closed,) and thereby the liquid in chamber 10 may be forced out of said chamber through the opening in the bottom thereof, so as to cause the level of the liquid on the outside of chamber 10 to rise. The oil and grease on the surface of the liquid in the vessel 1 are thereby caused to flow off through the discharge-pipe 13. The oil and grease within the chamber 10 being forced out of said chamber will also rise through the liquid on the outside of said chamber 10 and will flow off through pipe 13 in the same manner. During this process of forcing off the oil and grease the chamber 10 may be lowered from time to time in order to keep its mouth immersed in the fluid in vessel 1.

In the extraction of oil and grease from animal material much difficulty has been experienced in the past owing to the extreme viscosity of the oil and grease upon the surface of the fluid in the vessel wherein the separation is to be effected; but owing to the inclination of the sides of the vessel 1, as the level of the liquid is gradually raised by the application of pressure within the chamber 10, the oil and grease upon the surface of the water in said vessel are gradually concentrated and finally flow out through the discharge-pipe 13 without loss. Likewise the oil and grease within the chamber 10 are gradually concentrated as they are forced downwardly through the lower portion 11 of said chamber, so that sufficient depth of oil is maintained to prevent the oil from being blown aside, so as to permit the passage of the air or other gas under pressure employed under the edge of the chamber 10 until merely a thin film of oil the size of the opening in the lower end of chamber 10 remains. In this way practically all of the oil and grease within the charge admitted to the vessel 1 may be drawn off substantially without loss and without the admission of an excessive amount of water.

Instead of forcing all of the oil and grease within the chamber 10 out through the bottom thereof pressure may be applied to the chamber 10 only until the oil and grease on the outside of said chamber have been forced off, and then the operation may be reversed by opening the valve in pipe 15, closing the valves in pipes 16 and 13, and opening the valve in pipe 14, thereby applying pressure to the surface of the liquid outside of chamber 10 and forcing the oil and grease within said chamber out through the pipe 15. Owing to the upwardly-tapering sides of the main portion of the chamber 10 the oil and grease within said chamber are contracted in their passage upward through said chamber, so that they may flow out through pipe 15 without loss.

The chamber 10 is in function a "bell chamber" and is so termed in the following claims.

Application of suction to the pipe 14 has the same effect in so far as the drawing off of the oil and grease within the vessel 1 is concerned as the application of pressure through the pipe 16 to the interior of the bell chamber 10, provided, of course, air be admitted to the bell-chamber through the pipe 15 or otherwise while suction is so applied, and likewise application of suction to the interior of the bell chamber, coupled with the free admission of air to the interior of vessel 1, has the same effect in drawing off the oil and grease within said chamber as the application of pressure to the interior of vessel 1. I do not limit myself, therefore, to the application of pressure above atmospheric pressure for drawing off the oil and grease. What is required is that while the oil and grease are being drawn off from the vessel 1 a greater pressure shall be created and maintained in bell chamber 10 than exists at the time in vessel 1, and correspondingly all that is required to draw off the oil and grease from the bell chamber is that greater pressure shall be created and maintained in vessel 1 than exists at the time in chamber 10.

I do not limit myself to the particular details of construction herein illustrated and described nor to the use of my invention for the separation of oil and grease from fluids of greater density. The apparatus herein described may be employed for the separation of any fluids of different densities.

Having thus completely described my invention, what I claim, and desire to secure by Letters Patent, is—

1. In an apparatus for separating fluids of different densities, the combination, with a fluid-containing vessel, of a bell chamber within the same, both said vessel and said bell chamber being provided with means for permitting the escape of liquid therefrom at points above the normal level of the liquid, and means for creating either in said vessel or in said bell chamber, a greater pressure than exists at the time in the other of the said parts of the apparatus.

2. In an apparatus for separating fluids of different densities, the combination, with a fluid-containing vessel, of a bell chamber within the same, both said vessel and said bell chamber being provided with means for permitting the escape of liquid therefrom at points above the normal level of the liquid, means for creating in said bell chamber a greater pressure than exists at the time in said vessel, and means for creating in said vessel a greater pressure than exists at the time in said bell chamber.

3. In an apparatus for separating fluids of different densities, the combination, with a fluid-containing vessel, of a bell chamber within the same, and means for creating in said bell chamber greater pressure than exists at the time in said vessel, the latter having a discharge-orifice at a point above the normal level of the liquid in it, through which orifice liquid may escape.

4. In an apparatus for separating fluids of different densities, the combination, with a fluid-containing vessel, of a bell chamber within the same, said vessel having sides which taper upwardly and having a discharge-orifice in its contracted upper portion, and means for creating in said bell chamber greater pressure than exists at the time in said vessel.

5. In an apparatus for separating fluids of different densities, the combination, with a fluid-containing vessel, of a bell chamber within the same, the annular space between the vessel and bell chamber being of less cross-sectional area near the tops of said chamber and vessel than near the bottom of the bell chamber, and said vessel having a discharge-orifice in its upper portion, and means for creating in the bell chamber greater pressure than exists at the time in the vessel.

6. In an apparatus for separating fluids of different densities, the combination, with a fluid-containing vessel, of a bell chamber within the same having a downwardly-tapering lower portion, the said vessel having a discharge-orifice at a point above the normal level of the liquid therein, and means for creating in the bell chamber a greater pressure than exists at the time in the said vessel.

7. In an apparatus for separating fluids of different densities, the combination, with a fluid-containing vessel, of a bell chamber within the same having the form of two cones with their bases toward each other, the said vessel having a discharge-orifice at a point above the normal level of the liquid therein, and means for creating in the bell chamber a greater pressure than exists at the time in the said vessel.

8. In an apparatus for separating fluids of different densities, the combination, with a fluid-containing vessel, having a charging-opening in its upper portion, of a bell chamber within said vessel, forming a continuation of the charging-opening and open at the bottom, said vessel being provided with a discharge-orifice in its upper portion, and means for creating in the bell chamber a greater pressure than exists at the time in the vessel.

9. In an apparatus for separating fluids of different densities, the combination, with a fluid-containing vessel, of a bell chamber within the same, and adjustable up and down, said bell chamber being provided with means for creating in it greater pressure than exists at the time in said vessel, and said vessel being provided with a discharge-orifice at a point above the normal level of the liquid in it, and means for moving the bell chamber up and down.

10. In an apparatus for separating fluids of different densities, the combination, with a fluid-containing vessel, of a bell chamber within the same, and adjustable up and down, said vessel and bell chamber being provided, both, with means for permitting the escape of fluids therefrom at points above the normal level of the liquid, and with means for creating either in said vessel or in said bell chamber, at will, a greater pressure than exists at the time in the other of the said parts of the apparatus, and means for moving the bell chamber up and down.

11. In an apparatus for separating fluids of different densities, the combination, with a fluid-containing vessel, having an opening in its upper portion for the insertion of a charge, and a valve for closing said opening, of a tube within said vessel, forming a continuation of said charging-opening, and a bell chamber mounted upon said tube and adjustable vertically thereon, and having an opening in its lower end below the normal level of the fluid in the vessel, said vessel having a discharge-opening in its upper portion, and means for creating in the bell chamber greater pressure than exists at the time in the said vessel.

In testimony whereof I affix my signature in the presence of two witnesses.

DANIEL HOWARD HAYWOOD.

Witnesses:
H. M. MARBLE,
RITA BRADT.